INVENTOR.
PAUL R. BENSON
BY
ATTORNEY

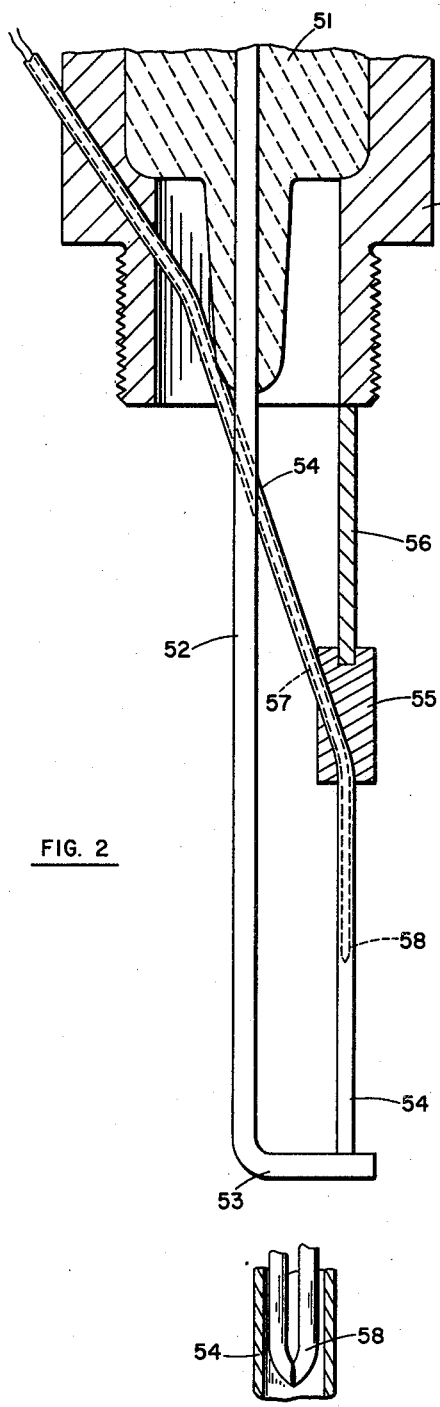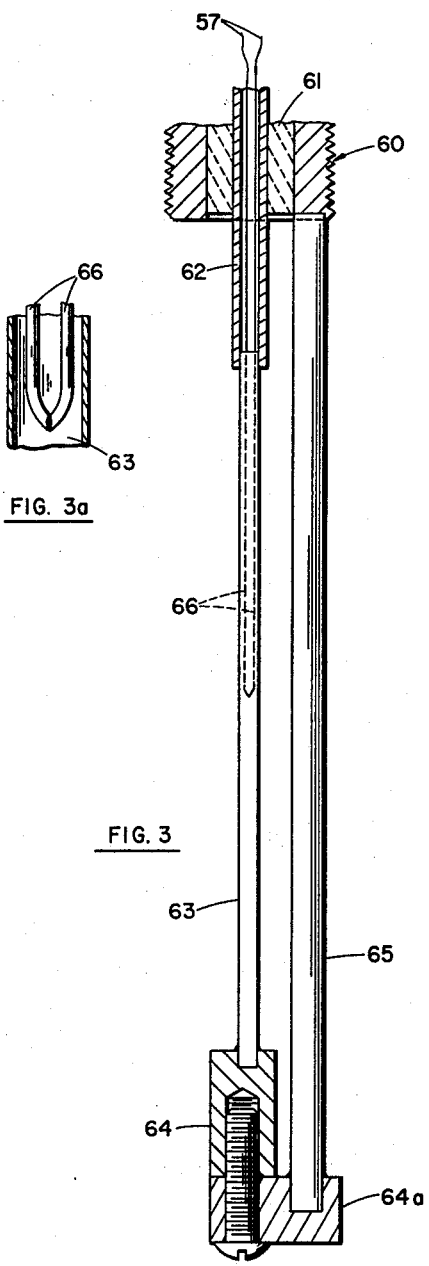

United States Patent Office 3,148,534
Patented Sept. 15, 1964

3,148,534
APPARATUS FOR TESTING ORGANIC LIQUID
FILM FORMING CHARACTERISTICS
Paul R. Benson, Canoga Park, Calif., assignor to
North American Aviation, Inc.
Filed Nov. 16, 1961, Ser. No. 152,751
2 Claims. (Cl. 73—61)

The present invention is directed to a method and apparatus for testing and measuring the film forming characteristics of organic fluids and more particularly to apparatus for performing pyrolytic capsule fouling tests on organic fluids.

The fouling characteristics of various organic liquids used as jet and rocket fuels, petroleum refinery streams, and nuclear reactor moderators and/or coolants and the rate of film formation of these organics is of extreme importance in determining the conditions under which they may be safely used. Heretofore, the fouling or film forming characteristics of organic liquids have been measured by utilizing a flowing stream of organic under controlled temperature conditions passing through a section of tubing heated to a high temperature and an indication of the fouling characteristic obtained by measuring the reduction of flow through a filter in the stream. Such systems require individual pumps for each system, prevention of leaks in a flowing system, large amounts of the fluid under test, individual heat sources for each system, and the use of individual filter elements; and they have the inherent disadvantage that reproducibility of conditions for a number of tests on different organics is difficult. The present invention eliminates many of these disadvantages and provides a simple, inexpensive method of obtaining film forming information.

Therefore it is the primary object of the present invention to provide apparatus for measuring the fouling characteristics of an organic liquid which requires small amounts of the liquid and utilizes a static system.

Another object of the present invention is to provide an apparatus for measuring the fouling characteristics of an organic liquid in which the environmental conditions may be applied to a plurality of samples, thereby increasing the reproducibility of results.

A further object of the present invention is to provide an apparatus for simulating environmental conditions for film forming tests of organic liquids.

These and other objects and advantages of the present invention will be more apparent from the following detailed description and the figures, made a part hereof, in which:

FIG. 2 is a partially sectioned fouling test heater element for use in the apparatus of FIG. 1;

FIG. 2a is a detail sectional view of the heater thermocouple of FIG. 2;

FIG. 3 is a partially sectioned view of another heater element for use in the present invention; and FIG. 3a is a detail sectional view of the heater thermocouple of FIG. 3.

Figure 1:
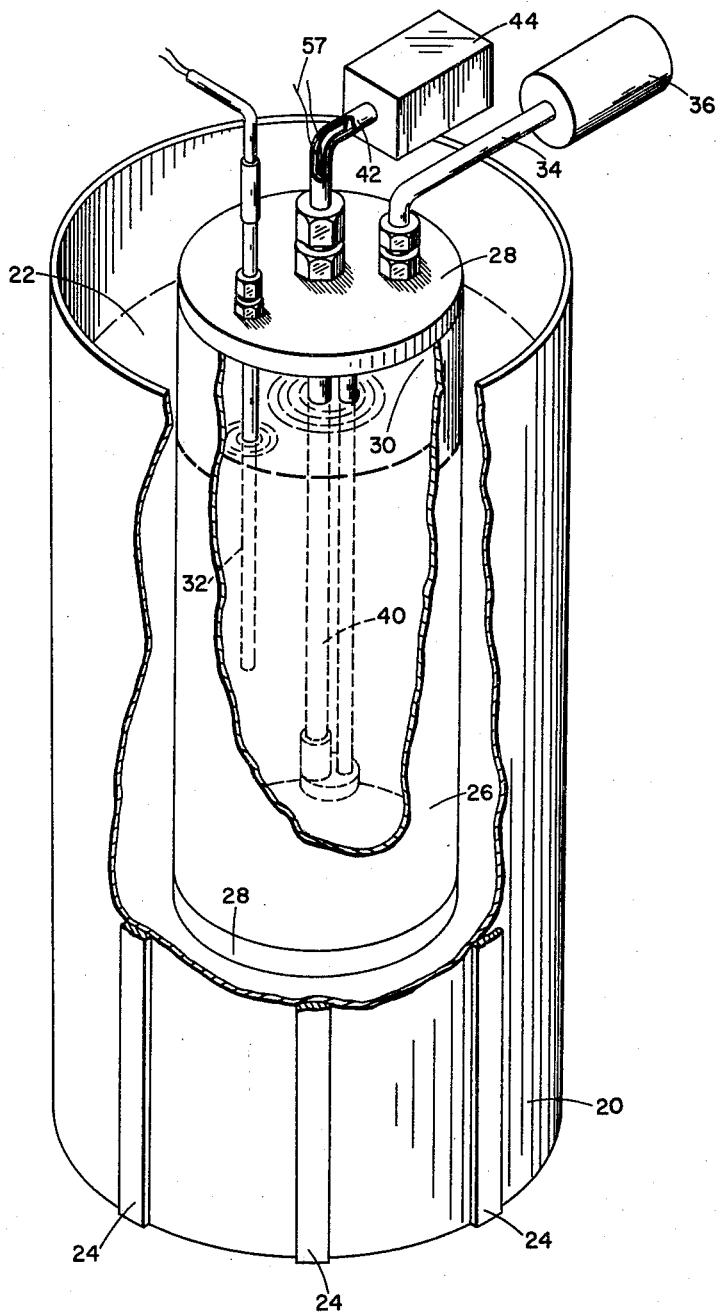
FIG. 1 is a partially sectioned perspective view of the apparatus of the present invention.

Referring now in detail to FIG. 1, the apparatus of the present invention is shown and includes an outer tank 20 containing a heat transfer salt bath 22, for example composed of a 50-50 mixture of sodium nitrite and potassium nitrate. The mixture melts at about 280° F. and is stable at operating temperatures at high as 1200° F. The tank 20 is preferably of stainless steel and has a plurality of Chromalox strip heaters 24 attached to the outside bottom and sides of the tank for heating the heat transfer salt bath. The temperature is controlled by a controller which operates an autotransformer as is well known in the art. The bath may be stirred by a mixer, not shown, so that an even temperature is obtained throughout the bath.

Suspended in the bath 22 are one or more capsules 26 having top and bottom caps 28 which are welded to the capsule 26 to form a closed sealed chamber 30. Three apertures are provided in the top cap 28. A bulk temperature thermocouple 32 is sealed to the walls of one of these apertures and extends into the chamber 30. The bulk temperature thermocouples are preferably $\frac{1}{16}$ inch sheathed, Chromel-Alumel couples with the junction positioned opposite the center of a heater element (described in detail hereinafter). A tube 34 is connected by a standard type tubing fitting to another of these apertures and connects the chamber 30 to a source of pressurized gas 36, preferably nitrogen, so that during testing the capsule may be pressurized to prevent boiling of the organic liquid therein. Since the bath 22 may accommodate more than one capsule 26 so that measurements and tests may be run under identical conditions on a plurality of different organic liquids, the nitrogen pressure may be applied to each of the capsules from a manifold through a needle valve for each individual capsule. A pressure gauge and rupture diaphragm may also be provided for each capsule.

A test heater element, indicated generally at 40, is sealed to the top cap 28 and extends downwardly into the chamber 30. The chamber 30 holds about 250 to 300 grams of the organic liquid to be tested, and the liquid is introduced into the chamber 30 through the centrally located test heater element aperture before the heater is inserted. The power lead 42 of the test heater 40 is connected to a power supply shown schematically at 44. The power supply 44 preferably includes a voltage regulator with individual autotransformers and step-down transformers and an adjustable resistor for controlling the surface temperatures of individual heater elements.

The heater elements preferred for the present invention are shown in FIGS. 2 and 3. FIG. 2 shows a spark plug type test heater which has a cylindrical base 50, a ceramic insulator 51 sealed within the base 50, and a wire 52 sealed to the insulator 51 and extending downwardly with an outwardly extending foot portion 53. The wire 52 functions as an electrical connection from power leads 42 and as a heating tube support. The heating tube 54, preferably of $\frac{1}{32}$ in. O.D., 0.004 in. wall stainless steel, is silver soldered to the foot 53 and extends through a brass connecting piece 55, to which it is silver soldered, at an angle so as to pass through the spark plug base 50. The brass piece 55 is supported on a wire 56 from the spark plug base 50. In this manner the tube 54 has its interior channel open so that the leads 57 of the surface thermocouple 58 can be brought to the exterior of the capsule (see FIG. 2a). The surface thermocouple 58 is insulated from and positioned inside the heater tube 54 at the midpoint of heated length between foot 53 and brass piece 55.

A second heater unit shown in FIG. 3 is less delicate than the heater previously described and comprises a base or electrode seal 60 which is positioned within the central aperture of cap 28 and includes a ceramic insulator 61 through which a power lead in the form of a copper tube 62 extends. A heater tube 63 of $\frac{1}{16}$ in. O.D., 0.006 in. wall stainless steel extends downwardly to a bottom element 64 and is silver soldered to the lower end of tube 62 and the upper end of element 64. A total of 3 in. of tubing is exposed for heating the surrounding medium. A bottom connector 64a attached by a screw or other means extends outwardly from element 64. A stainless steel support rod 65 rigidly secures the connector 64a to the electrode seal 60 and serves as an electrical connection. In this manner the heater section may be easily removed and replaced. A thermocouple 66, located at the midpoint within and insulated from tube 63 has its leads 57 extending out through the tube 62 and measures the surface temperature of heater tube 63 (see FIG. 3a).

In operation the organic to be tested is placed in the capsule 26, i.e. about 240 grams, and the heater inserted. The capsule is suspended in any well known manner in the molten salt bath. The pressurized nitrogen supply is then connected to the capsule and a pressure of 600 p.s.i.g. maintained. Power and thermocouple connections are then made and the desired heat conditions imposed. The heated organic within the capsule 26 contains film-forming components which adhere to the heater tube 40. The amount of film formed may then be measured by standard methods, e.g. measurement of the film thickness by a high magnification microscope focused on the tube surface subsequent to the physical removal of a film chip. The amount of film being dependent upon operating conditions and upon the past history of the organic but independent of the heater tube area.

The heater element is heated to a temperature of about 1000° F. for example, while the salt bath is heated to a temperature of about 600° F. The value of the temperature to be used is determined by the ultimate use of the organic and the temperature stability of the organic. Thus the above temperatures are representative values for fouling tests of organics to be used as moderators and/or coolants for nuclear reactors where the heater element temperature corresponds to the combined effects of radiation and fuel element temperature. However, while the exact temperatures may vary, it is essential that the heater temperature be higher than the organic temperature, since the film-forming or fouling mechanism of organic fluids is such that the chemical decomposition of the organic, which is one of the factors in film formation, takes place at the surface of the hot element. Thus the heater element must be run at a higher temperature in order to obtain a film on the surface. Testing times may be of any duration, although testing times of 90 hours were used under the above-specified conditions. Tests of shorter duration giving equivalent results may be made by changing the test conditions.

The present invention therefore provides a means for obtaining specimens of organic film and fouling components from a sample when the conditions under which the film or component adheres to the heater tube may be carefully controlled and where the same conditions can be applied to numerous samples utilizing the same major components of the apparatus.

Although a particular embodiment of the present invention has been described, various modifications will be apparent to those skilled in the art. Therefore, the present invention is not limited to the specific embodiment disclosed but only by the appended claims.

What is claimed is:

1. Apparatus for testing the film forming characteristics of an organic liquid in a static environment comprising at least one vessel, means for applying an inert pressurized atmosphere in said vessel, a heater element disposed in said vessel, said vessel adapted to contain a quantity of organic liquid in a quantity sufficient to at least partially immerse said heater in the organic liquid, means for heating said element to a first temperature, and means including a bath surrounding said vessel for heating the contained organic liquid to a second temperature less than said first temperature.

2. The apparatus of claim 1 including first temperature sensing means within said heater element for monitoring the temperature of said heater element, and second temperature sensing means for measuring the temperature of the organic liquid quantity so that said first and second temperatures are monitored during said test.

References Cited in the file of this patent

UNITED STATES PATENTS

| 2,339,026 | Mercer | Jan. 11, 1944 |
| 2,500,964 | Sullivan et al. | Mar. 21, 1950 |
| 2,875,313 | King | Feb. 24, 1959 |
| 2,996,594 | Tuttle | Aug. 15, 1961 |
| 3,059,467 | Meguerian et al. | Oct. 23, 1962 |

FOREIGN PATENTS

| 185,814 | Great Britain | Sept. 4, 1922 |
| 119,711 | Sweden | Sept. 9, 1947 |